Feb. 13, 1968 W. COOK 3,369,084

EXTENSION CORD REEL

Filed Dec. 21, 1964

INVENTOR.
WILLIAM COOK

BY Kimmel, Crowell & Weaver
ATTORNEYS.

United States Patent Office 3,369,084
Patented Feb. 13, 1968

3,369,084
EXTENSION CORD REEL
William Cook, 387 E. Northampton St.,
Wilkes-Barre, Pa. 18702
Filed Dec. 21, 1964, Ser. No. 419,812
3 Claims. (Cl. 191—12.4)

ABSTRACT OF THE DISCLOSURE

A manually portable reel for paying off or recovering an electric cord or cable wound thereon and including means fixedly mounted in the reel, for rotation therewith, for electrically and mechanically connecting the cord with a secondary electrical circuit.

This invention relates to an extension cord reel and has as its primary object the provision of a convenient means for storing an extension cord which may be rapidly unreeled for the purposes of obtaining specific cord lengths as required for the user's need.

An additional object of the invention is the provision of such a cord reel provided with a female socket into which any desired electrical light or appliance may be plugged, and an extensible cord having at its other end a male plug which may be unwound from the reel to any desired length within the capacity thereof and plugged into an electrical outlet.

A further object of the invention is the provision of such a reel which may be readily rewound to accommodate any excess cord, thus avoiding entangling cords on the floor of an area wherein the device is used.

A further object of the invention is the provision of a device of this character which is sturdy and durable in construction, reliable and efficient in operation, and relatively simple and inexpensive to manufacture, assemble and utilize.

Still other objects reside in the combinations of elements, arrangements of parts, and features of construction, all as will be more fully pointed out hereinafter and shown in the accompanying drawing wherein there is disclosed a preferred embodiment of this inventive concept.

In the drawing.

Similar reference characters refer to similar parts throughout the several views of the drawing.

Figures 1, 2:
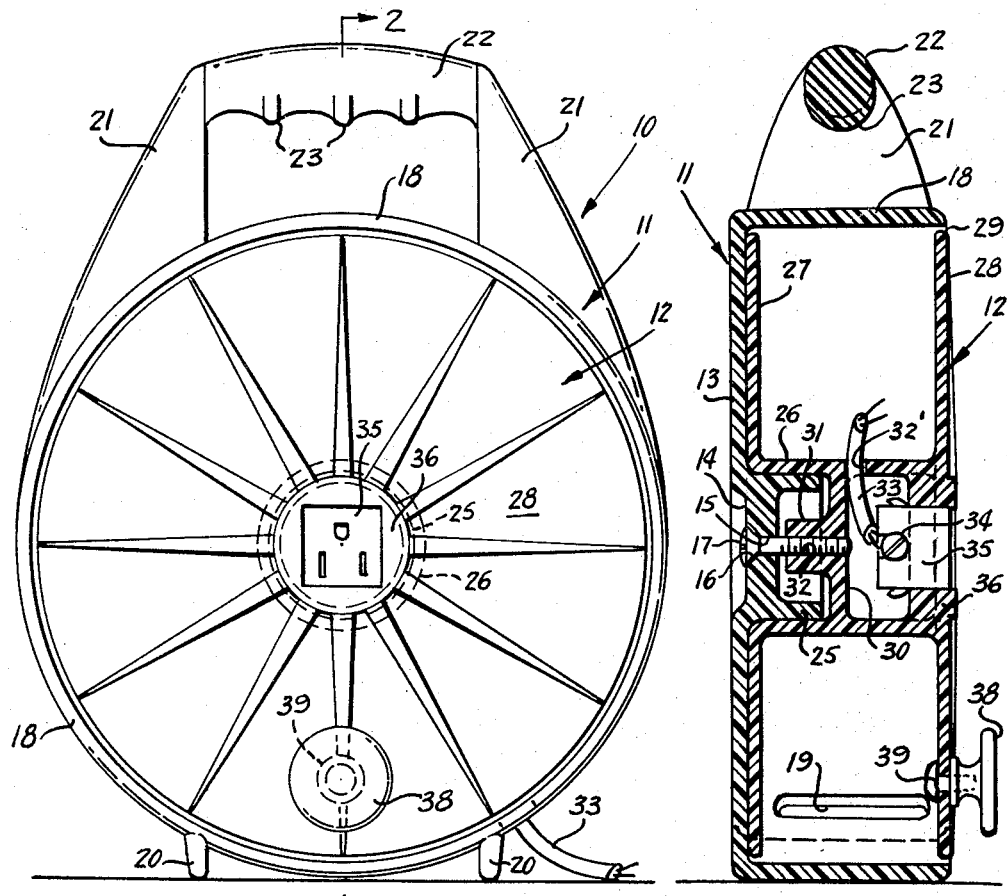
FIGURE 1 is a side elevational view of one form of extension cord reel embodying the instant inventive concept.
FIGURE 2 is a longitudinal sectional view taken substantially along the line 2—2 of FIGURE 1, as viewed in the direction indicated by the arrows.

Referring now to the drawing in detail, the extension cord reel of the instant invention is generally indicated at 10 and is comprised of two basic components, a housing generally indicated at 11 and a reel generally indicated at 12. Housing 11 includes a substantially circular side wall 13 having a central recess 14, which is provided centrally with a smooth bore 15 having a countersunk opening 16 at its outer face for the accommodation of a screw 17, the purpose of which will be more fully described hereinafter.

Casing 11 also includes an annular rim 18, which is provided on one side adjacent its bottom with an elongated transverse slot 19. A pair of protuberances 20 on opposite sides of the lower center serve as supports to prevent rotation of the cylindrical casing when placed on the ground. Upwardly extending projections 21, integral with the rim 18, are connected at their tops by a handle member 22, the under side of which is serrated as at 23 to provide a finger grip to facilitate the carrying and handling of the device.

Figure 3:
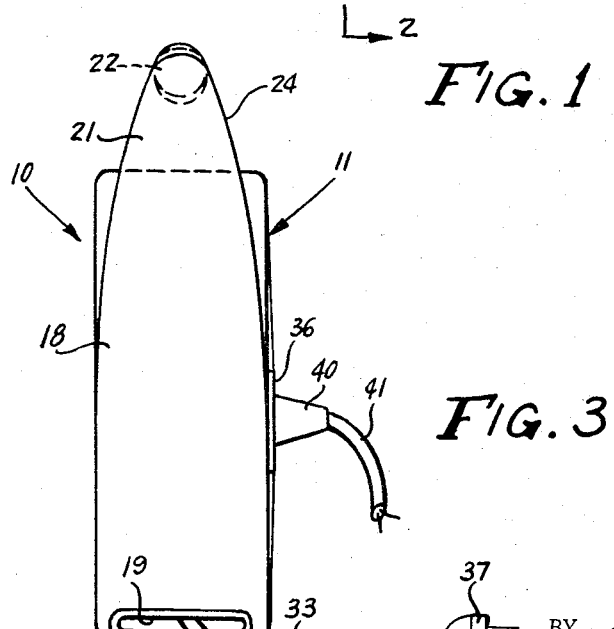
FIGURE 3 is a reduced end elevational view of the structure of FIGURE 1, as viewed from the left, an appliance cord being shown attached thereto.

As best shown in FIGURE 3, the outer surfaces of projections 21 taper inwardly as at 24 to form the circular top surface of the handle 22. Interiorly of the side wall 13 and surrounding rim 18 is a central hollow boss 25 upon which is rotatably mounted the hub 26 of a reel member, which includes inner and outer side plates 27 and 28 respectively of a diameter to rotate smoothly within the casing 11, the side plate 28 being aligned with the outer edge of rim 18, as indicated at 29. Hub 26 is divided into two sections by a partition wall 30 from one side of which extends a boss 31 having an internally threaded bore 32 into which the screw 17 is threaded, so that the hub 26 may rotate about the outer rim of boss 25. On the other side of partition 30 the hub is provided with an opening 32' through which extends one end of an extension cord 33, the wires of which are connected by contact screws 34 to a conventional female socket assembly 35, preferably of the three wire type, having a rectangular face, which is probably affixed to an outer hub wall 36 which closes the outer end of the hub, and which is flush with outer side plate 28.

The extension cord 33 is of any desired length and is wound continuously about hub 26, having its other end extending outwardly through the slot 19, and terminating in a male plug 37.

A knob 38 is rotatably mounted on a stud or post 39, which extends through outer plate 28 in flush relation with the interior thereof, at a point adjacent its periphery.

From the foregoing, the use and operation of the device should now be readily understandable. Plug 37 is secured in any convenient electrical outlet, and the reel assembly lifted by the handle 22 and carried to a desired location, the cord 33 automatically unwinding and paying out as the reel is moved. When the reel has reached the desired location, a plug 40 connected to a cord 41 associated with an electrical light, appliance or other electrical article is simply inserted in the female plug 34, and an effective circuit is thus established at any desired location within the limits of the effective length of the cord 33. When the extension cord is no longer required, the article may be lifted by the handle 22, and the cord wound by rotation of the wheel by means of handle 38.

It will now be seen that there is herein provided improved extension cord reel which accomplishes all the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

I claim:

1. An extension cord reel comprising a casing having a substantially circular side wall, an annular rim including a transverse slot and an open side, an inwardly extending circular hollow boss in the center of said side wall, and a smooth bore in said boss extending through said side wall, a handle extending upwardly and outwardly from said annular rim and supporting feet connected to and projecting from the lower side of said annular rim opposite said handle, a reel including inner and outer side plates and a central hub, rotatable in said housing, means rotatably securing said hub to said boss, said means comprising an annular recess in said hub surrounding said boss, a partition at the inner end of said recess, a stud having a threaded bore therein extending from said partition into said hollow boss, and a screw extending through said smooth bore and threaded into said threaded bore, a female socket fixedly mounted in said hub for rotation therewith, said female socket confronting said opening, an electric cord wound on said hub and having one end electrically and mechanically connected to said female socket, the other end of said cord extending outwardly through said slot, and a male plug electrically and mechanically connected to said other end of said cord.

2. The structure of claim 1 wherein the outer side plate of said reel has a handle means thereon offset from the center, whereby said reel may be rotated to rewind said cord.

3. The structure of claim 2 wherein said handle comprises a rotatably mounted knob.

References Cited
UNITED STATES PATENTS

| | | |
|---|---|---|
| 1,682,421 | 8/1928 | Rosenbaum _____ 191—12.2 X |
| 1,858,538 | 5/1932 | Coolick. |
| 2,590,890 | 4/1952 | Redo _____ 191—12.4 |
| 2,654,828 | 10/1953 | Vandenberg _____ 191—12.4 X |
| 2,821,579 | 1/1958 | Benjamin _____ 191—12.4 |
| 3,093,341 | 6/1963 | Meletti. |

FOREIGN PATENTS

| | | |
|---|---|---|
| 45,819 | 9/1935 | France. |
| 212,956 | 1/1958 | Australia. |
| 326,484 | 3/1930 | Great Britain. |
| 776,738 | 6/1957 | Great Britain. |
| 1,217,563 | 12/1959 | France. |

ARTHUR L. LA POINT, *Primary Examiner.*

STANLEY T. KRAWCZEWICZ, *Examiner.*